United States Patent
Gorday et al.

(10) Patent No.: US 7,519,042 B2
(45) Date of Patent: Apr. 14, 2009

(54) APPARATUS AND METHOD FOR MIXED-MEDIA CALL FORMATTING

(75) Inventors: Robert M. Gorday, Wellington, FL (US); Paul Edward Gorday, West Palm Beach, FL (US); Salvador Sibecas, Lake Worth, FL (US); Philip P. Macnak, West Palm Beach, FL (US)

(73) Assignee: Motorola, Inc., Schaumburg, IL (US)

( * ) Notice: Subject to any disclaimer, the term of this patent is extended or adjusted under 35 U.S.C. 154(b) by 998 days.

(21) Appl. No.: 10/660,937

(22) Filed: Sep. 12, 2003

(65) Prior Publication Data

US 2005/0058075 A1    Mar. 17, 2005

(51) Int. Cl.
*H04B 7/212* (2006.01)
(52) U.S. Cl. ............................................. 370/347
(58) Field of Classification Search ................. None
See application file for complete search history.

(56) References Cited

U.S. PATENT DOCUMENTS

| | | | |
|---|---|---|---|
| 4,965,569 A | | 10/1990 | Bennett et al. |
| 5,406,557 A | | 4/1995 | Baudoin |
| 5,742,905 A | * | 4/1998 | Pepe et al. ............... 455/461 |
| 5,822,404 A | * | 10/1998 | Cave ...................... 379/88.13 |
| 5,950,123 A | * | 9/1999 | Schwelb et al. ........... 455/414.4 |
| 6,151,576 A | * | 11/2000 | Warnock et al. ............ 704/260 |
| 6,167,122 A | * | 12/2000 | Titmuss et al. ........... 379/93.15 |
| 6,212,550 B1 | | 4/2001 | Segur |
| 6,490,550 B1 | * | 12/2002 | Hiri ........................... 704/201 |
| 6,496,693 B1 | * | 12/2002 | Tran ......................... 455/426.1 |
| 6,577,859 B1 | * | 6/2003 | Zahavi et al. ............. 455/412.1 |
| 6,763,089 B2 | * | 7/2004 | Feigenbaum ................. 379/52 |
| 6,823,184 B1 | * | 11/2004 | Nelson ........................ 455/418 |
| 6,826,407 B1 | * | 11/2004 | Helferich ..................... 455/466 |
| 6,931,255 B2 | * | 8/2005 | Mekuria ...................... 455/466 |

FOREIGN PATENT DOCUMENTS

| | | |
|---|---|---|
| DE | 19959903 A1 | 7/1999 |
| EP | 0851403 A2 | 7/1998 |
| EP | 0872827 A2 | 10/1998 |
| GB | 2082820 A | 8/1981 |
| GB | 2183880 A | 11/1986 |
| GB | 2323693 A | 3/1997 |
| GB | 2372864 A | 2/2001 |
| GB | 2362745 A | 5/2001 |
| GB | 2381208 A | 5/2003 |
| WO | 8705735 A | 3/1987 |
| WO | 9737500 A | 3/1997 |
| WO | 0115423 A1 | 3/2001 |
| WO | 0180078 A1 | 10/2001 |

* cited by examiner

*Primary Examiner*—Frank Duong
(74) *Attorney, Agent, or Firm*—Gary J. Cunningham

(57) ABSTRACT

An apparatus and method for mixed-media call formatting. A preferred format for a call can be determined from different mixed media communication formats. The mixed media communication formats can include a text format and an audible speech format. A media format mode signal can be sent or received. The media format mode signal can indicate a preferred format for a call. The call can be connected in the preferred format.

26 Claims, 6 Drawing Sheets

APPARATUS AND METHOD FOR MIXED-MEDIA CALL FORMATTING

BACKGROUND

1. Field

The present disclosure is directed to an apparatus and method for mixed-media call formatting. In particular, the present disclosure is directed to an apparatus and method that allows for different call format selections at an electronic device depending on different criteria.

2. Description of Related Art

Presently, many communication devices are obtaining multimedia capability. For example, cellular phones can have data capabilities such as information management, web browsing, short messaging, and the like. Also, traditional data products, like pagers, can incorporate real-time voice and graphics capability. In addition to offering separate new features, the combination of different types of media can offer new capabilities not available with single media types alone. For example, voice and data can offer different ways for users to interact. In particular, present devices can allow two or more users to carry on a text chat session or a voice call.

Unfortunately, there is no means to adapt each side of a conversation to the most appropriate media type for each user's environment. For example, a user using text communications cannot communicate with a user using speech communications.

BRIEF DESCRIPTION OF THE DRAWINGS

The preferred embodiments of the present invention will be described with reference to the following figures, wherein like numerals designate like elements, and wherein.

DETAILED DESCRIPTION OF PREFERRED EMBODIMENTS

Figure 1:
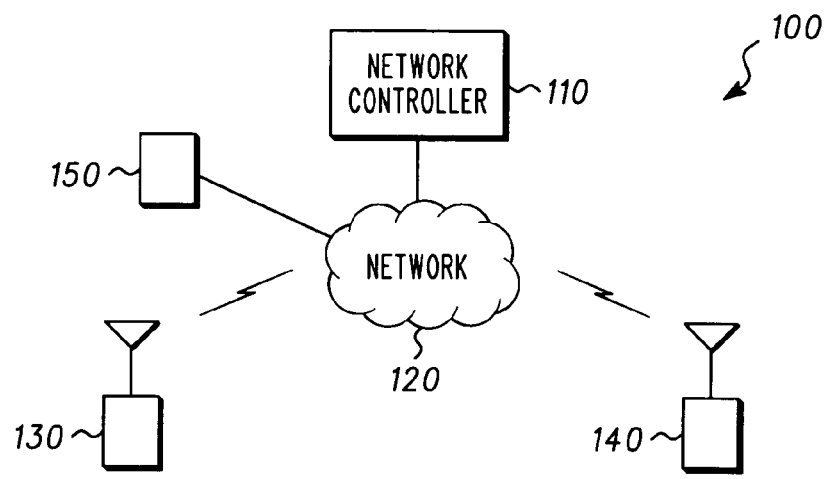
FIG. 1 is an exemplary block diagram of a system according to one embodiment.

The disclosure provides an apparatus and method for mixed-media call formatting. According to one embodiment, the present disclosure provides a method of selection of a mixed media communication format at a portable communication device. The method can include determining, by the portable communication device, a preferred format for an incoming call from mixed media communication formats, the mixed media communication formats including a text format and an audible speech format. The method can also include sending, by the portable communication device, a media format mode signal indicating a preferred format for the incoming call. For example, the media format mode signal may be sent prior to call setup, at call setup, during a call, or at any other useful time for indicating a preferred format for a call.

According to another embodiment, the present disclosure provides a method of selection of a mixed media communication format at a portable communication device when receiving a signal of an incoming call. The mixed media communication format can include an audio communication format and a text communication format. The method can include receiving, by the portable communication device, a signal of an incoming call. The method can also include determining, by the portable communication device, a preferred format of the incoming call. The method can further include sending, by the portable communication device, a media format mode signal indicating the preferred format for the incoming call.

According to another embodiment, the present disclosure provides a system for the selection of a mixed media communication format. The system can include a network and a controller coupled to the network. The controller can be configured to determine the format of a call from a call originator, determine a selected format of the call for a call recipient based on selection conditions of the call recipient, convert the format of the call to the selected format when the format of the call from the call originator does not match the selected call format of the call for the call recipient, and send the call in the selected format to the call recipient.

According to another embodiment, the present disclosure provides a portable communication device for providing selection of a mixed media communication format. The portable communication device can include a transceiver and a processor coupled to the transceiver. The processor can be configured to determine a preferred format for an incoming call from mixed media communication formats and send a media format mode signal indicating a preferred format for the incoming call. The mixed media communication formats can include a text format and an audible speech format.

Thus, the present disclosure can allow two or more users to have a mixed-media call where each user can select the media format used on their device. For example, a person can initiate a voice call from a traditional telephone to a mixed-media device user who is in a meeting. The mixed-media device user can accept the voice call. Alternately, the mixed-media device user can receive the voice signal and listen to it with an earpiece while responding with text. Also, the device or the system the device is used on can perform speech-to-text and text-to-speech conversion so the mixed-media device user can communicate only using text. Each user can select the format most appropriate for the user's current situation. Also, since some devices can only support one media format, the system can automatically convert the communications to the appropriate media type.

In one embodiment, a user can be allowed to manually select a desired media format. This selection can take place at any time before or during a call. For example, the user can perform a predetermined key sequence on the user's device to select the desired media format. Once the media format selection is made, the device can send a media format selection command to the system where appropriate media format conversions can be performed.

Thus, based on the media types supported by a device, a system can automatically choose the appropriate media format to send. For example, a phone call placed to a personal digital assistant can be automatically converted to text. Also, if during peak hours the system capacity cannot support an additional voice call, rather than blocking a new call, the system can prompt one or both callers to accept a free mixed-media call. The media formatting can be done so the wireless users can send and receive text, which requires lower bandwidth than voice. Additionally, placing a device in a silent mode can automatically generate a request to convert a voice call to text. Exiting silent mode can automatically restore voice communication.

The present disclosure also provides signals that can be used between a device and the system to implement mixed-media conversions. One signal can be a media format mode signal that indicates the desired media format of the device. This signal can be sent from the device to the system each time the device changes a format mode. Alternately, to conserve the amount of control signaling, the system can poll the device for its current media format selection during registration or call setup. Another signal can be a media format negotiation signal that can be sent to a calling party or a called party if the media format selection of the device being called is different from the media format of the calling party. This signal can indicate the media format selection of the device being called and can give the calling party the option of accepting a mixed-media call, give the calling party the option of changing the media format to match that of the party being called, request that the party being called accept the calling party's format, or give either party the option to end the call. An additional signal can be a background signal used when converting text to speech. This signal can be added by the system to add a background signal such as music to remove the lengthy silence between text bursts and let a telephone user know that a call is still active.

FIG. 1 is an exemplary block diagram of a system 100 according to one embodiment. The system 100 can include a network controller 110, a network 120, and one or more communication devices 130, 140, and 150. The communication devices 130, 140, and 150 may include telephones, wireless telephones, cellular telephones, personal digital assistants, computer terminals, pagers, fax machines, answering machines, interactive televisions or any other devices that are capable of sending and receiving data.

In an exemplary embodiment, the network controller 110 is connected to the network 120. The network controller 110 may be located at a base station, a service center, a media conversion center, or any other location on the network 120. The network 120 may include any type of network that is capable of sending and receiving communication signals. For example, the network 120 may include a data network, such as the Internet, an intranet, a local area network (LAN), a wide area network (WAN), a cable network, and other like communication systems. The network 120 may also include a telecommunications network, such as a local telephone network, long distance telephone network, cellular telephone network, satellite communications network, cable television network and other like communications systems. Furthermore, the network 120 may include more than one network and may include a plurality of different types of networks. Thus, the network 120 may include a plurality of data networks, a plurality of telecommunications networks, a combination of data and telecommunications networks and other like communication systems.

In operation, one of the communication devices 130, 140, or 150, may attempt a communication with a receiving communication device 130, 140, or 150. This communication can be routed through the network 120 and the network controller 110 to the receiving communication device. For example, a call originator communication device 130 may attempt a call to a call recipient communication device 140. The controller 110 can determine the format of the call from a call originator 130 to be a text format, an audible format, or other media format. A text format may be a messaging service format or the like and an audible format may be a speech format or the like. The controller 110 can then determine a selected format of the call for a call recipient 140 based on selection conditions of the call recipient 140. For example, the controller 110 can store a desired selected format of the call recipient 140 after receiving a media format mode signal from the call recipient 140. The controller 110 can also poll the call recipient 140 during call setup to determine a present desired format of the call recipient 140. The controller 110 can further determine the format of the call based on a call recipient communication device capability of supporting specific types of media. For example, the call recipient communication device 140 may be a pager that is only capable of sending and receiving text. The controller 110 can additionally determine the format for the incoming call based on a current system capacity. For example, when there is a high capacity of communications on the network 120, the controller 110 may determine the format of the incoming call to be a text format because such a format requires less system resources. The controller 110 can further determine the format for the incoming call based on the call originator 130 being given and accepting an option to accept a mixed media call. The controller 110 can also determine the format for the incoming call based on the call recipient 140 accepting an option to accept a call in the format of the call originator 130. The controller 110 can further determine the format for the incoming call based on either the call originator 130 or the call recipient 140 selecting an option to end the call.

The controller 110 can then convert the format of the call to the selected format when the format of the call from the call originator 130 does not match the selected call format of the call for the call recipient 140. For example, the controller 110 can convert the format of the call by sending a media format negotiation signal to the call originator 130 to prompt the call originator 130 to change the format of the call based on the selected format. The controller 110 can also convert the format of the call by performing text-to-speech conversion on the call when the controller 110 determines the format of the call is a text format and the selected format for the call is an audible format. The controller 110 can additionally convert the format of the call by performing speech-to-text conversion on the call when the controller 110 determines the format of the call is an audible format and the selected format for the call is a text format. The controller 110 can then send the call in the selected format to the call recipient 140. The controller 110 can also send a background signal to the recipient of the call while awaiting communications from the call originator 130. For example, the controller 110 can send a background signal to a cellular phone using an audible format while awaiting text entry from a pager using a text format. This background signal can inform the call recipient 140 that the call is still connected during pauses for text entry.

Figure 2:
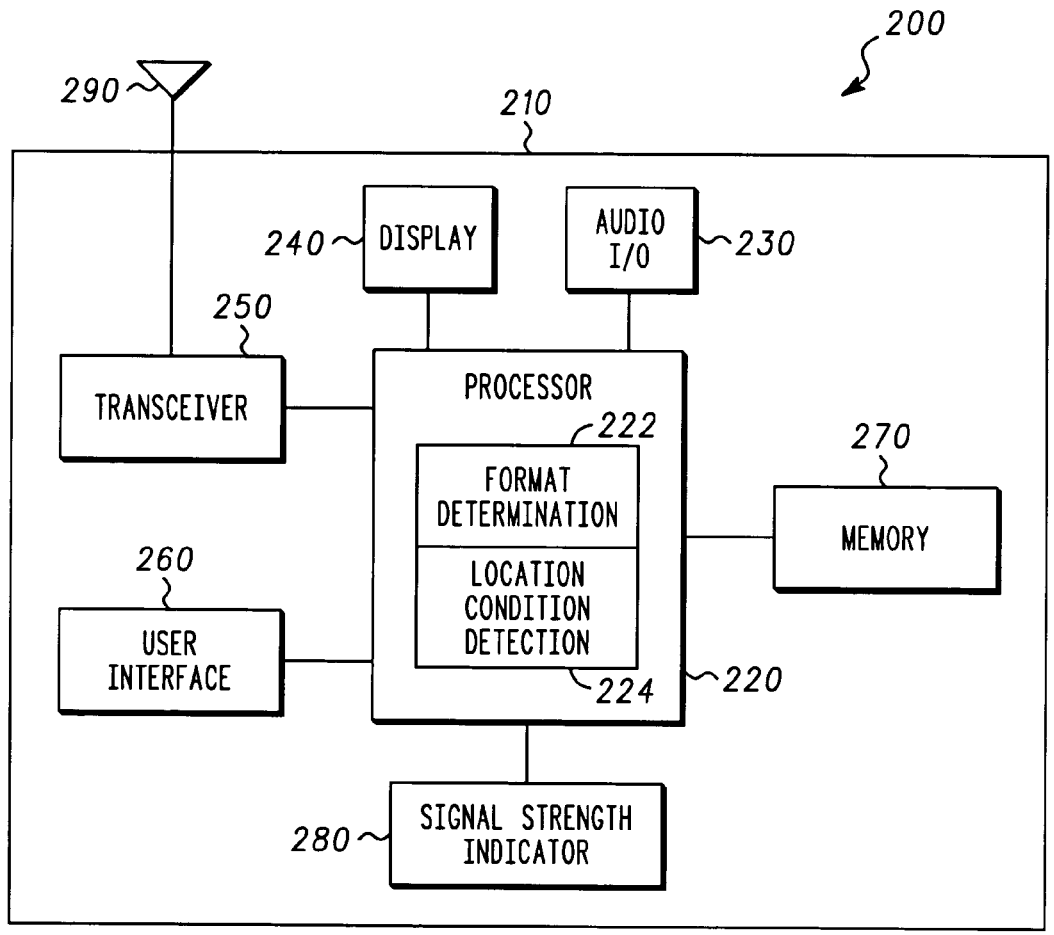
FIG. 2 is an exemplary block diagram of a portable communication device according to one embodiment.

FIG. 2 is an exemplary block diagram of a mobile or portable communication device 200, such as the communication devices 130 or 140 according to one embodiment. The mobile communication device 200 can include a housing 210, a processor 220 coupled to the housing 210, audio input and output circuitry 230 coupled to the housing 210 and the processor 220, a display 240 coupled to the housing 210 and the processor 220, a transceiver 250 coupled to the housing 210 and the processor 220, a user interface 260 coupled to the housing 210 and the processor 220, a memory 270 coupled to the housing 210 and the processor 220, a signal strength indicator 280 coupled to the housing 210 and the processor 220, and an antenna 290 coupled to the housing 210 and the transceiver 250. The processor 220 can include a format determination module 222 and a location condition detection module 224. The modules 222 and/or 224 may be hardware coupled to the processor 220, modules located within the processor 220, software located in the memory 270 and executed by the processor 220, or any other type of module. The memory 270 may include a random access memory, a read only memory, an optical memory, a subscriber identity module memory, or any other memory that can be coupled to a mobile communication device. The display 240 can be a liquid crystal display (LCD), a light emitting diode (LED) display, a plasma display, or any other means for displaying information. The transceiver 250 may include a transmitter and/or a receiver. The audio input and output circuitry 230 can include a microphone, a speaker, a transducer, or any other audio input and output circuitry. The user interface 260 can include a keypad, buttons, a touch pad, a joystick, an additional display, or any other device useful for providing an interface between a user and a electronic device.

In operation, the processor 220 controls the functions of the mobile communication device 200. The mobile communication device 200 can send and receive signals across the network 120 using the transceiver 250 coupled to the antenna 290. Additionally, a user can use the user interface 260 for input and output of information to and from the mobile communication device 200. This information can also be input and output using the audio input and output circuitry 230 and can additionally be output using the display 240. The memory 270 can store programs and data for use by the processor 220.

According to one embodiment, the processor 220 and/or the format determination module 222 can determine a preferred format for an incoming call from mixed media communication formats. The mixed media communication formats can include a text format, an audible speech format, or other formats. The processor 220 can determine the preferred format for the incoming call based a user selection of a preferred format on the user interface 260 where the selection can be stored in the memory 270. The processor 220 can also determine the preferred format for the incoming call based on location conditions of the portable communication device. These location conditions can be detected and determined by the processor 220 or the location condition detection module 224. For example, the processor 220 can determine the preferred format to be a text format for the incoming call based on the communication device 200 being located in an area where text communications are preferred over voice communications. Also, the location conditions can include a velocity of the portable communication device and the processor 220 can determine the preferred format to be a voice format for the incoming call based on the communication device 200 traveling at a velocity where voice communications are preferred over text communications. The location conditions can additionally include a plurality of co-located portable communication devices and the processor 220 can determine the preferred format to be a text format for the incoming call based on the plurality of co-located portable communication devices being above a specified threshold. The location conditions can further include a signal strength. For example, the signal strength indicator 280 can indicate the strength of a signal received from the network 120. The processor 220 can determine the signal strength based on the signal strength indicator 280. The signal strength indicator 280 can indicate the signal strength based on a received signal strength indicator, a signal-to-noise ratio, or any other information useful to determine a signal strength. The processor 220 can then determine the preferred format to be a text format for the incoming call based on a poor signal strength.

The processor 220 can also receive an indication of a high system capacity from the network 120. The processor 220 can then prompt a user of the portable communication device 200 with an option to only transmit and receive text format communications based on receiving the indication of a high system capacity. If the processor 220 receives a text format selection from the user in response to the prompt, the processor 220 can determine the preferred format to be a text format for the incoming call based on the text format selection. The processor 220 can also determine the format for the incoming call to be a text format based on a silent mode selected by the user of the portable communication device 200. After determining the preferred format, the processor 220 can send a media format mode signal indicating a preferred format for the incoming call.

Thus, communication device 200 can automatically decide which media format mode to be in. As discussed, this media format mode can be based on the location of the communication device 200. The location can be determined using conventional means such as the proximity to a wide local area network base site, a wide area wireless method such as signal direction, signal times of arrival, signal strength, location fingerprinting, or the like, global positioning system indicators, a server-assisted global positioning system means, or the like. For example, this criteria can be used to automatically adjust the communication device 200 for text-in and text-out in areas such as churches, concert halls, theaters, restaurants, or the like where voice calls are not desirable.

As also discussed, the media format mode can also be based on the velocity of the communication device 200. The velocity can be determined using conventional means such as signal characterization using Doppler spread or level-crossing rates, global positioning system means, a link to a vehicular system, or any other useful means. This criterion can be used to automatically adjust the communication device 200 for a voice-in and voice-out mode when in a vehicle, where text entry by a driver is not preferred.

As further discussed, the media format mode can also be based on a number of devices co-located with the communication device 200. The number of co-located devices can be determined using conventional methods such as a wide local area network connection to other devices, information from a system indicating device density in the current area, or any other useful method. This criterion can be used to place the communication device 200 in text-in and text-out mode when a user is in a meeting or auditorium where a minimum number of other devices are detected.

As additionally discussed, the media format mode can also be based on a signal strength received at the communication device 200. This signal strength can be determined using conventional methods such as a received signal strength indicator, a signal-to-noise ratio, or any other useful method. This criterion can be used to automatically adjust the communication device 200 for text-in and text-out mode in poor signal strength conditions. This can be useful because text can be more robust than voice since it supports larger interleaving depths and ARQ techniques.

Figure 3:
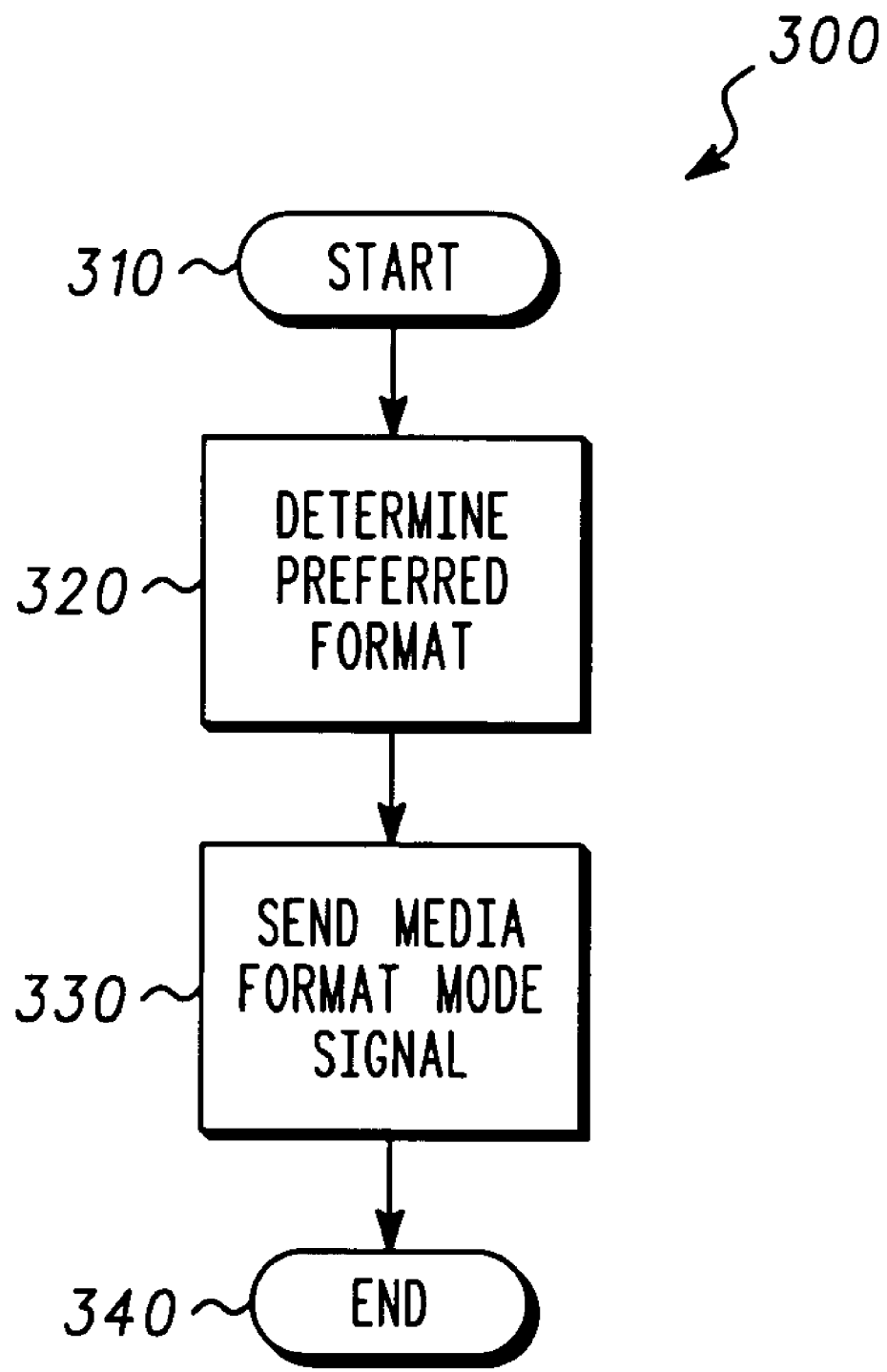
FIG. 3 is an exemplary flowchart outlining the operation of a processor according to a first embodiment.

FIG. 3 is an exemplary flowchart 300 outlining the operation of the processor 220 and/or the modules 222 and 224 according to a first embodiment. In step 310 the flowchart begins. In step 320, the processor 220 determines a preferred format for an incoming call from mixed media communication formats. For example, this determination can be done prior to call setup, at call setup, during a call, or at any other useful time for determining or changing a preferred format for a call. The mixed media communication formats can include a text format and an audible speech format. The processor 220 can determine the preferred format for the incoming call based on location conditions of the portable communication device 200. For example, the processor 220 can determine the preferred format to be a text format for the incoming call based on the portable communication device 200 being located in an area where text communications are preferred over voice communications. The location conditions can include a velocity of the portable communication device 200. This velocity can be determined using global positioning system technology, or any other technology useful for determining the movement or velocity of a device. The processor 220 can then determine the preferred format to be a voice format for the incoming call based on the communication device traveling at a velocity where voice communications are preferred over text communications. For example, the processor 220 may determine a voice format because detected velocity of the portable communication device 200 implies the portable communication device 200 is in a car.

The location conditions can also include a plurality of co-located portable communication devices. For example, a plurality of co-located portable communication devices may indicate the portable communication device 200 is in an area where a meeting is taking place. Thus, the processor 220 can determine the preferred format to be a text format for the incoming call based on the plurality of co-located portable communication devices being above a specified threshold. The location conditions can also include a signal strength such as a strength of a received wireless communications signal. The signal strength can be determined by a signal strength indicator 280 where the signal strength indicator can include at least one of a received signal strength indicator and a signal-to-noise ratio. The processor 220 can then determine the preferred format to be a text format for the incoming call based on a poor signal strength.

The processor 220 receive an indication of a high system capacity from the network 120. The processor 220 can then prompt a user of the portable communication device 200 with an option to only transmit and receive text format communications based on receiving an indication of a high system capacity. After receiving a text format selection from the user in response to the prompting, the processor 220 can determine the preferred format to be a text format for the incoming call based on the text format selection. The processor 220 can also determine the format for the incoming call to be a text format based on a silent mode selected by the user of the portable communication device 200.

The processor 220 can further determine the format for the incoming call based on a call originator being given and accepting an option to accept a mixed media call. The processor 220 can also determine the format for the incoming call based on a call recipient accepting an option to accept a call in the format of a call originator. The processor 220 can further determine the format for the incoming call based on either a call originator or a call recipient selecting an option to end the call.

In step 330, the processor 220 sends a media format mode signal indicating a preferred format for the incoming call. For example, the processor 220 sends the media format mode signal to the network controller 110 where it is used to determine the preferred format for a call to the mobile communication device 200. In step 340, the flowchart ends.

Figure 4:
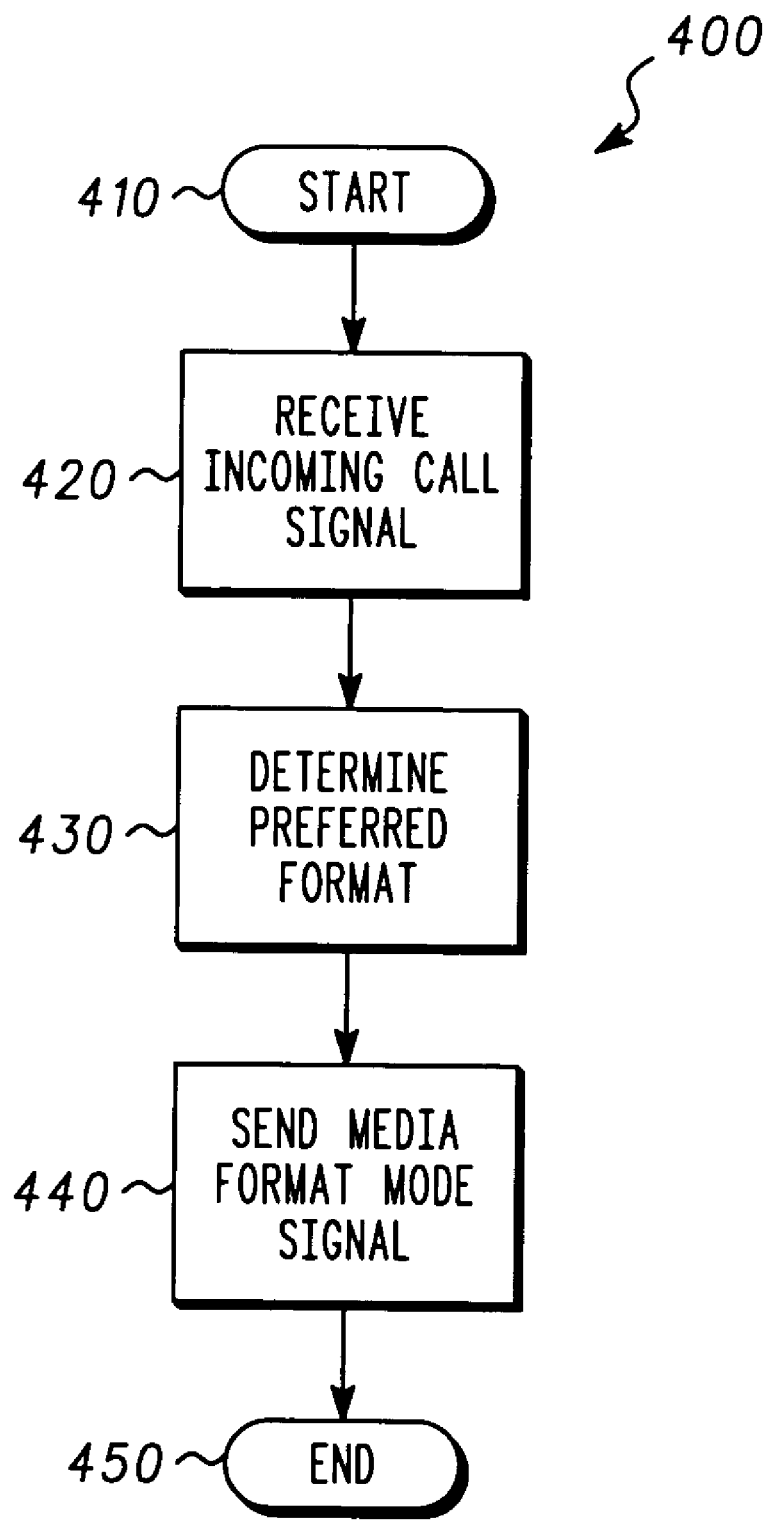
FIG. 4 is an exemplary flowchart outlining the operation of a processor according to a second embodiment.

FIG. 4 is an exemplary flowchart 400 outlining the operation of the processor 220 according to a second embodiment. In step 410, the flowchart begins. In step 420, the processor 220 receives an incoming call signal. For example, the processor 220 can receive the incoming call signal from the network 120. In step 430, the processor 220 can determining a preferred format of the incoming call. This preferred format can be previously stored in the memory 270 of the portable communication device 200 or can be determined in response to receiving the incoming call signal. For example, the portable communication device 200 can accept a user input of media format selection data of a preferred communication format, can store the media format selection data for a preferred communication format based on location conditions, or can otherwise obtain media format selection data for a preferred communication format. This media format selection data can be stored in the memory 270 and/or transmitted to the controller 110 of the system 100. The processor 220 can display a current media format mode on the display 240 of the portable communication device 200. This displayed the current media format mode can include a current media format input mode and a current media format output mode.

In step 440, the processor 220 can send a media format mode signal indicating the preferred format for the incoming call. In step 450, the flowchart ends. The flowchart 400 can include all features of the flowchart 300 and can additionally provide for sending the media format mode signal in response to receiving an incoming call signal.

Figure 5:
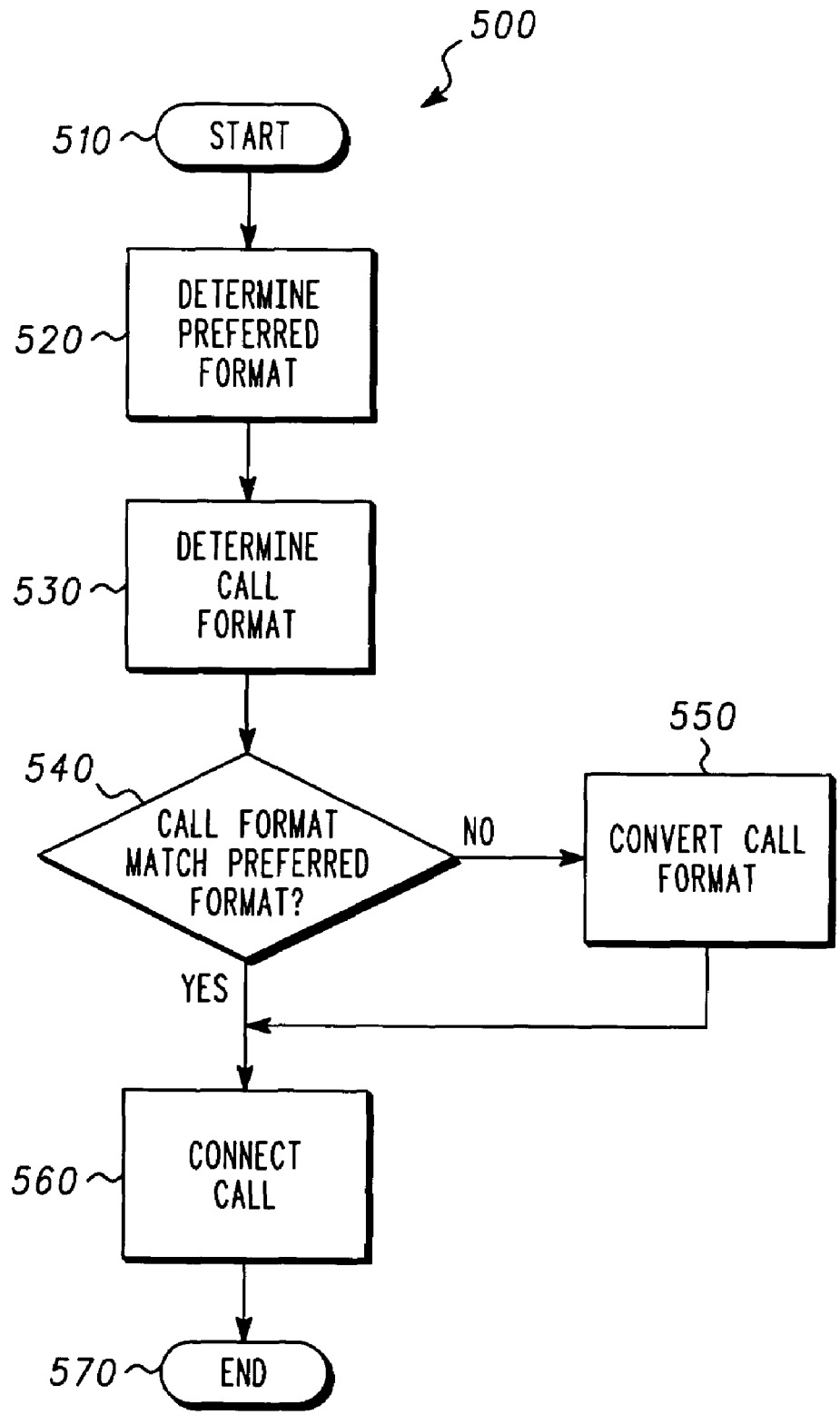
FIG. 5 is an exemplary flowchart outlining the operation of a network controller according to one embodiment.

FIG. 5 is an exemplary flowchart 500 outlining the operation of the network controller 110 according to one embodiment. In step 510, the flowchart begins. In step 520, the network controller 110 determines a preferred format for a call for a call recipient. For example, a user of an electronic device can register a preferred format with the network controller 110 and the network controller 110 can store the preferred format. In step 530, the network controller 110 determines the call format of the call from the call originator. The network controller 110 may switch steps 520 and 530. For example, the network controller 110 may first detect a call placed by the call originator and the format of the call. The network controller 110 may then determine the preferred or desired format of the call recipient during call setup or during other initial communications to the call recipient. The network controller 110 may also determine that the preferred format of the call recipient allows for any type of incoming call.

In step 540, the network controller 110 determines if the call format matches the preferred format. If the call format does not match the preferred format, in step 550, the network controller 110 converts the call format to the preferred format. For example, the network controller 110 may communicate to the call originator to switch call formats, may perform call format conversion at the controller, or may even deny the call if the call format does not match the preferred format. In step 560, the network controller 110 sends the call in the selected format to the call recipient. In step 570, the flowchart ends.

Figure 6:
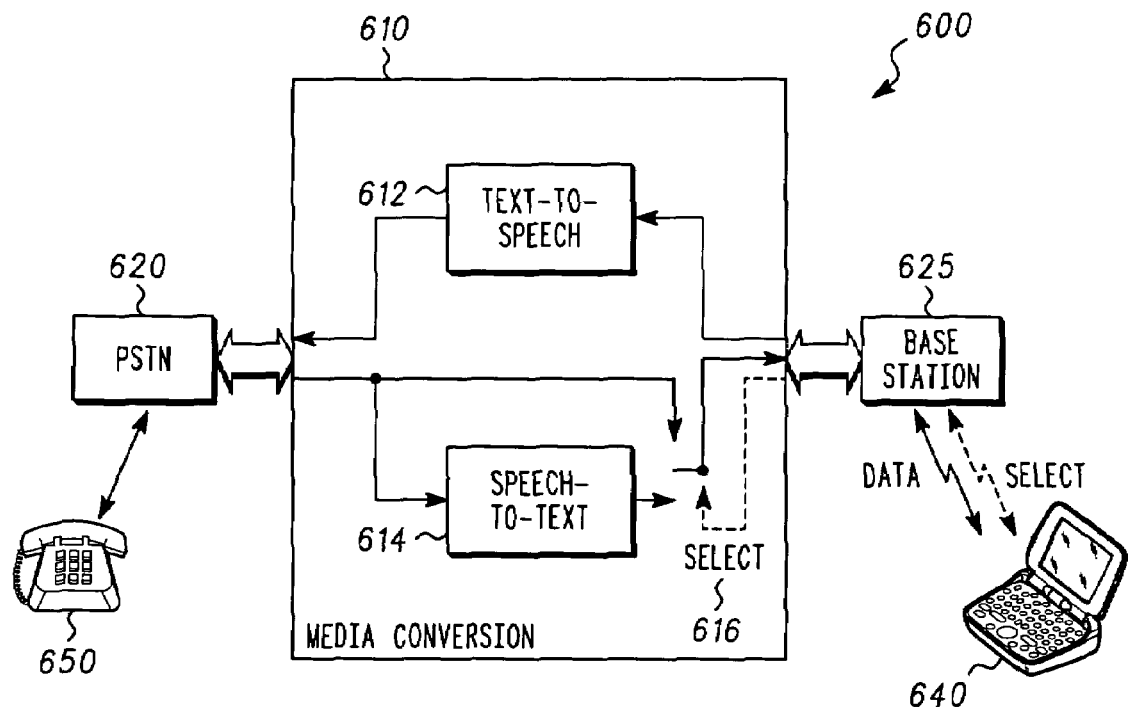
FIG. 6 is an exemplary block diagram of a system according to another embodiment.

FIG. 6 is an exemplary block diagram of a system 600 according to another embodiment. The system 600 can include a media conversion module 610, a public switched telephone network 620, a base station 625, a device 640, and a device 650. The device 640 may be a pager, a mobile phone, a device with voice and text capability, or any other communication device. The device 650 may be a telephone or any other communication device that can place a voice call. The media conversion module 610 may be located within the network controller 110 and can include a text-to-speech conversion module 612, a speech-to-text conversion module 614, and a format selection switch 616. The format selection switch 616 may be a hardware switch, a software switch, a preferred media format indicator stored in memory, or any other element useful for indicating a preferred media format of a receiving device. The public switched telephone network 620 and the base station 625 may be located within the network 120.

In operation, the device 640 can send a signal to the base station 625 to select whether to receive a call in a voice mode or in text mode. If a call originator uses the device 650 to place a voice call and the device 640 has selected a text mode, the communications sent from the device 650 to the device 640 are converted from speech to text using the speech-to-text conversion module 614 and the communications sent from the device 640 to the device 650 are converted from text to speech using the text-to-speech conversion module 612. Thus, for example, a voice and data pager device can select whether to receive an incoming call as text or speech. The pager's selection can be signaled to a base station and then relayed to a part of a system 100 where media conversion can take place. The media conversion can take place in a base station, by a third party service provider, such as a third party on the Internet who provides voice-over-IP and text chat services, or at some other point in the system 100.

Figure 7:
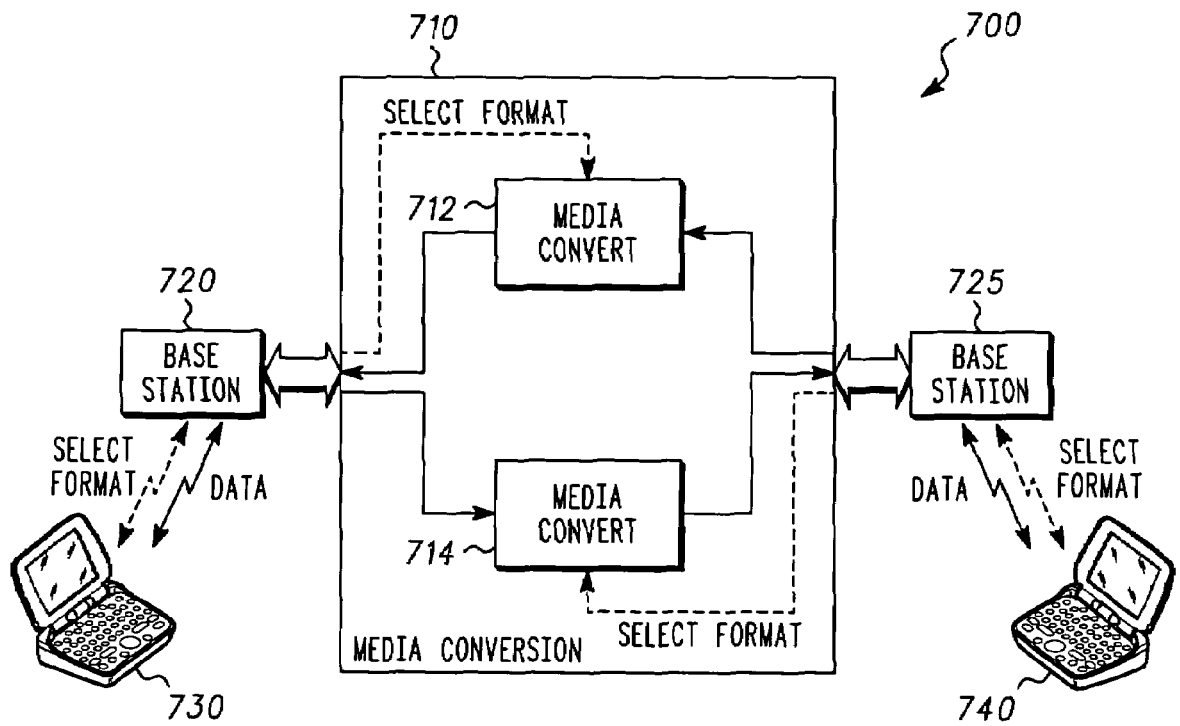
FIG. 7 is an exemplary block diagram of a system according to another embodiment.

FIG. 7 is an exemplary block diagram of a system 700 according to another embodiment. The system 700 can include a media conversion module 710, base stations 720 and 725, a device 730, and a device 740. The devices 730 and 740 may be pagers, mobile phones, devices with voice and data capability, or any other communication devices. The media conversion module 710 may be located within the network controller 110 and can include a first media conversion module 712 and a second media conversion module 714. The base stations 720 and 725 may be located within the network 120 and may be the same base station if the two devices 730 and 740 are located in the same cell. In operation, each of the devices 730 and 740 can select the desired or preferred formats for each side of a call or session. Signals can be sent to the media conversion module 710 indicating the selected or desired formats. If a session is initiated and the media conversion module 710 determines the formats are incompatible, the media conversion module 710 can use the first media conversion module 712 and the second media conversion module 714 to convert communications between the devices 730 and 740 to the desired formats. Thus, for example, two wireless multimedia devices can be used. Each user can select whether to accept an original media format sent by another user or to convert the media format as appropriate for the user. As an alternative, to performing media conversion, the system 700 can prompt a calling party to change its media type to match that of the receiving party. For example, the entire connection can be converted from a dedicated voice call to a two-way text chat session.

Figure 8:
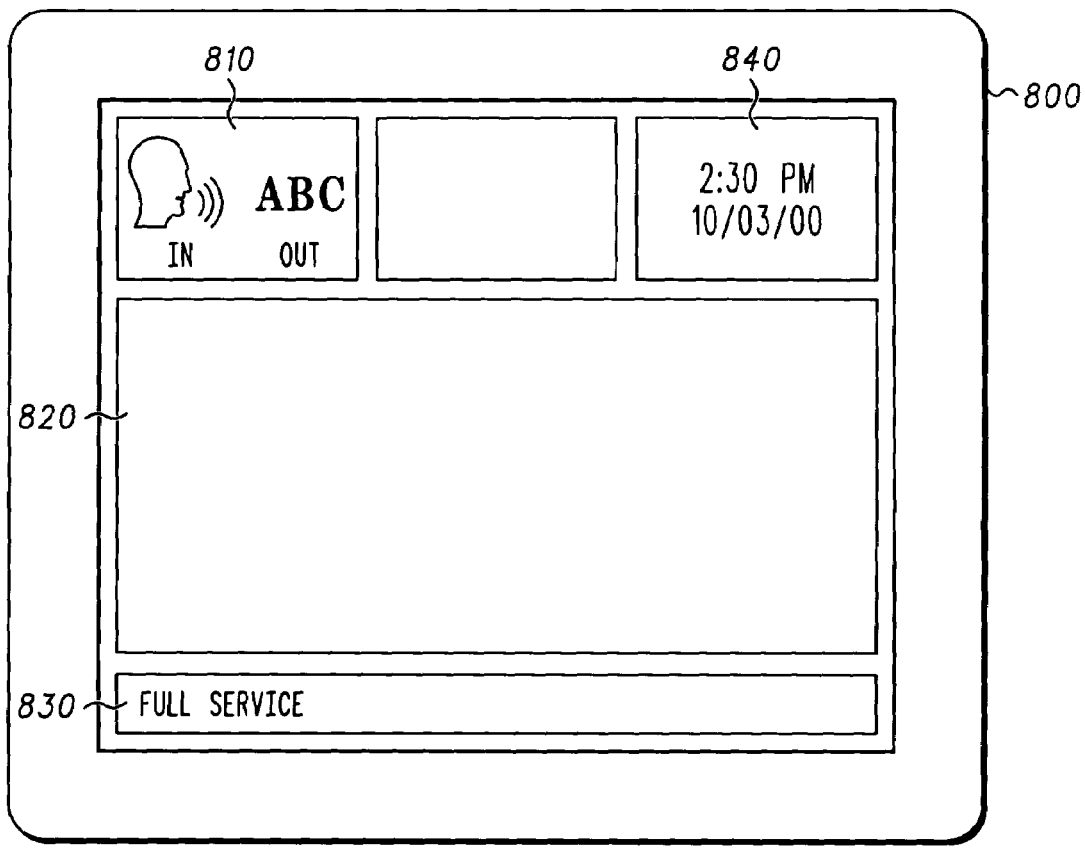
FIG. 8 is an exemplary illustration of a display according to one embodiment.

FIG. 8 is an exemplary illustration of a display 800 such as display 240 according to one embodiment. The display 800 can include a media format mode indicator 810. The display 800 may also include a text display area 820, a service-type indicator 830, and a time and date indicator 840. The media format mode indicator 810 can indicate a current media format mode of the electronic device 200. For example, the media format mode indicator 810 can indicate voice in and text out, which indicates the system 100 can send voice information to the electronic device 200 and a user of the electronic device 200 can respond with text.

Figure 9:
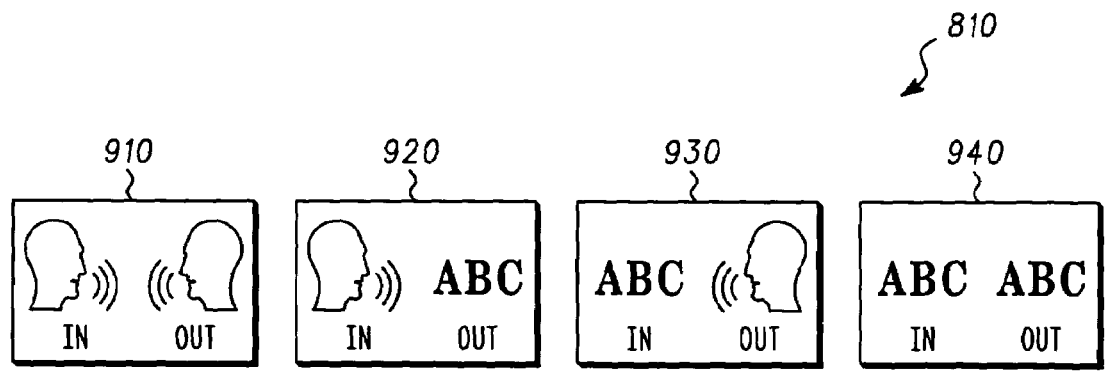
FIG. 9 is an exemplary illustration of different media format mode indicator displays according to different embodiments.

FIG. 9 is an exemplary illustration of different media format mode indicator displays according to different embodiments. For example, the media format mode indicator 810 can indicate voice in and voice out 910, voice in and text out 920, text in and voice out 930, and text in and text out 940.

The method of this invention is preferably implemented on a programmed processor. However, network controller 110 and/or the processor 220 may also be implemented on a general purpose or special purpose computer, a programmed microprocessor or microcontroller and peripheral integrated circuit elements, an ASIC or other integrated circuit, a hardware electronic or logic circuit such as a discrete element circuit, a programmable logic device such as a PLD, PLA, FPGA or PAL, or the like. In general, any device on which resides a finite state machine capable of implementing the flowcharts shown in the Figures may be used to implement the processor functions of this invention.

While this invention has been described with specific embodiments thereof, it is evident that many alternatives, modifications, and variations will be apparent to those skilled in the art. For example, various components of the embodiments may be interchanged, added, or substituted in the other embodiments. Accordingly, the preferred embodiments of the invention as set forth herein are intended to be illustrative, not limiting. Various changes may be made without departing from the spirit and scope of the invention.

What is claimed is:

1. A method of selection of a mixed media communication format at a portable communication device comprising:

determining, by the portable communication device, a preferred format for an incoming call from mixed media communication formats based on location conditions of the portable communication device including a velocity of the portable communication device, the mixed media communication formats including a text format and an audible speech format; and sending, by the portable communication device, a media format mode signal indicating the preferred format for the incoming call.

2. The method of selection of a mixed media communication format according to claim 1, wherein determining determines the preferred format to be a text format for the incoming call based on the portable communication device being located in an area where text communications are preferred over voice communications.

3. The method of selection of a mixed media communication format according to claim 1, wherein determining determines the preferred format to be a voice format for the incoming call based on the communication device traveling at a velocity where voice communications are preferred over text communications.

4. The method of selection of a mixed media communication format according to claim 1, wherein the location conditions include a plurality of co-located portable communication devices.

5. The method of selection of a mixed media communication format according to claim 4, wherein determining determines the preferred format to be a text format for the incoming call based on the plurality of co-located portable communication devices being above a specified threshold.

6. The method of selection of a mixed media communication format according to claim 1, wherein the location conditions include a signal strength.

7. The method of selection of a mixed media communication format according to claim 6, wherein the signal strength is determined by a signal strength indicator, the signal strength indicator including at least one of a received signal strength indicator and a signal-to-noise ratio.

8. The method of selection of a mixed media communication format according to claim 7, wherein determining determines the preferred format to be a text format for the incoming call based on a poor signal strength.

9. The method of selection of a mixed media communication format according to claim 1, further comprising:
receiving an indication of a high system capacity;
prompting a user of the portable communication device with an option to only receive text format communications based on receiving the indication of a high system capacity; and
receiving a text format selection from the user in response to prompting,
wherein determining determines the preferred format to be a text format for the incoming call based on the text format selection.

10. The method of selection of a mixed media communication format according to claim 1, wherein determining determines the format for the incoming call to be a text format based on a silent mode selected by the user of the portable communication device.

11. The method of selection of a mixed media communication format according to claim 1, wherein determining determines the preferred format for the incoming call based on a user input of media format selection data.

12. The method of selection of a mixed media communication format according to claim 1, further comprising displaying a current media format mode on the portable communication device, the current media format mode including at least one of a current media format input mode and a current media format output mode.

13. A method of selection of a mixed media communication format at a portable communication device when receiving a signal of an incoming call, the method comprising:
receiving, by the portable communication device, a signal of an incoming call;
determining, by the portable communication device, a preferred format of the incoming call, the mixed media communication format including an audio communication format and a text communication format including:
receiving an indication of a high system capacity;
prompting a user of the portable communication device with an option to only receive text format communications based on receiving the indication of a high system capacity; and
receiving a text format selection from the user in response to prompting,
wherein determining determines the preferred format to be a text format for the incoming call based on the text format selection; and
sending, by the portable communication device, a media format mode signal indicating the preferred format for the incoming call.

14. The method of selection of a mixed media communication format according to claim 13, further comprising storing the preferred format for an incoming call on the portable communication device.

15. The method of selection of a mixed media communication format according to claim 13, further comprising accepting a user input of media format selection data of a preferred communication format and transmitting the media format selection data to a communication system.

16. The method of selection of a mixed media communication format according to claim 13, further comprising displaying a current media format mode on the portable communication device, the current media format mode including at least one of a current media format input mode and a current media format output mode.

17. A portable communication device for providing selection of a mixed media communication format comprising:
a transceiver;
a processor coupled to the transceiver, the processor configured to determine a preferred format for an incoming call from mixed media communication formats based on location conditions of the portable communication device including a signal strength, the mixed media communication formats including a text format and an audible speech format, and configured to send a media format mode signal indicating a preferred format for the incoming call.

18. The portable communication device according to claim 17, wherein the processor is further configured to determine the preferred format to be a text format for the incoming call based on the communication device being located in an area where text communications are preferred over voice communications.

19. The portable communication device according to claim 17, wherein the location conditions include a velocity of the portable communication device.

20. The portable communication device according to claim 19, wherein the processor is further configured to determine the preferred format to be a voice format for the incoming call based on the communication device traveling at a velocity where voice communications are preferred over text communications.

21. The portable communication device according to claim 17, wherein the location conditions include a plurality of co-located portable communication devices.

22. The portable communication device according to claim 21, wherein the processor is further configured to determine the preferred format to be a text format for the incoming call based on the plurality of co-located portable communication devices being above a specified threshold.

23. The portable communication device according to claim 17, further comprising a signal strength indicator coupled to the processor,
wherein the processor is further configured to determine the signal strength based on the signal strength indicator the signal strength indicator including at least one of a received signal strength indicator and a signal-to-noise ratio.

24. The portable communication device according to claim 23, wherein the processor is further configured to determine the preferred format to be a text format for the incoming call based on a poor signal strength.

25. The portable communication device according to claim 17,
wherein the processor is further configured to receive an indication of a high system capacity, prompt a user of the portable communication device with an option to only receive text format communications based on receiving the indication of a high system capacity, and receive a text format selection from the user in response to the prompt,
wherein the processor is further configured to determine the preferred format to be a text format for the incoming call based on the text format selection.

26. The portable communication device according to claim 17, wherein the processor is further configured to determine the format for the incoming call to be a text format based on a silent mode selected by the user of the portable communication device.

* * * * *